United States Patent [19]
Bar-Or et al.

[11] Patent Number: 5,771,327
[45] Date of Patent: Jun. 23, 1998

[54] OPTICAL FIBER PROBE PROTECTOR

[75] Inventors: David Bar-Or, Englewood; James S. Kimmel, Littleton; Francis A. Roth, Arvada, all of Colo.

[73] Assignee: Optical Biopsy, Knoxville, Tenn.

[21] Appl. No.: 749,957

[22] Filed: Nov. 18, 1996

[51] Int. Cl.$^6$ ............................................. G02B 6/36
[52] U.S. Cl. ........................ 385/139; 385/902; 128/667; 128/722
[58] Field of Search ................... 128/665, 722; 385/902, 139, 117, 118

[56] References Cited

U.S. PATENT DOCUMENTS

| | | | |
|---|---|---|---|
| 4,286,585 | 9/1981 | Ogawa | 128/772 |
| 5,510,895 | 4/1996 | Sahagen | 128/665 |

*Primary Examiner*—John Ngo
*Attorney, Agent, or Firm*—Pitts & Brittian, P.C.

[57] ABSTRACT

A fiber optic probe protector for protecting a fiber optic probe such that sterilization of the probe after each use is not necessary. The fiber optic probe protector includes a sheath, a window and a handle. The sheath defines a tubular configuration, a first end, and a second end and the window is mounted in the first end of the sheath. The handle defines a first end, a second end, an interior cavity and a locking means. The second end of the sheath is mounted to the first end of the handle and the interior cavity of the handle and the sheath provide a passage for a fiber optic probe therethrough such that the face of the probe abuts against the window. The locking means locks the fiber optic probe in position. The fiber optic probe protector also includes a vacuum assembly which when hooked to a vacuum removes secretions or fluid from the surface to be analyzed with the probe.

7 Claims, 2 Drawing Sheets

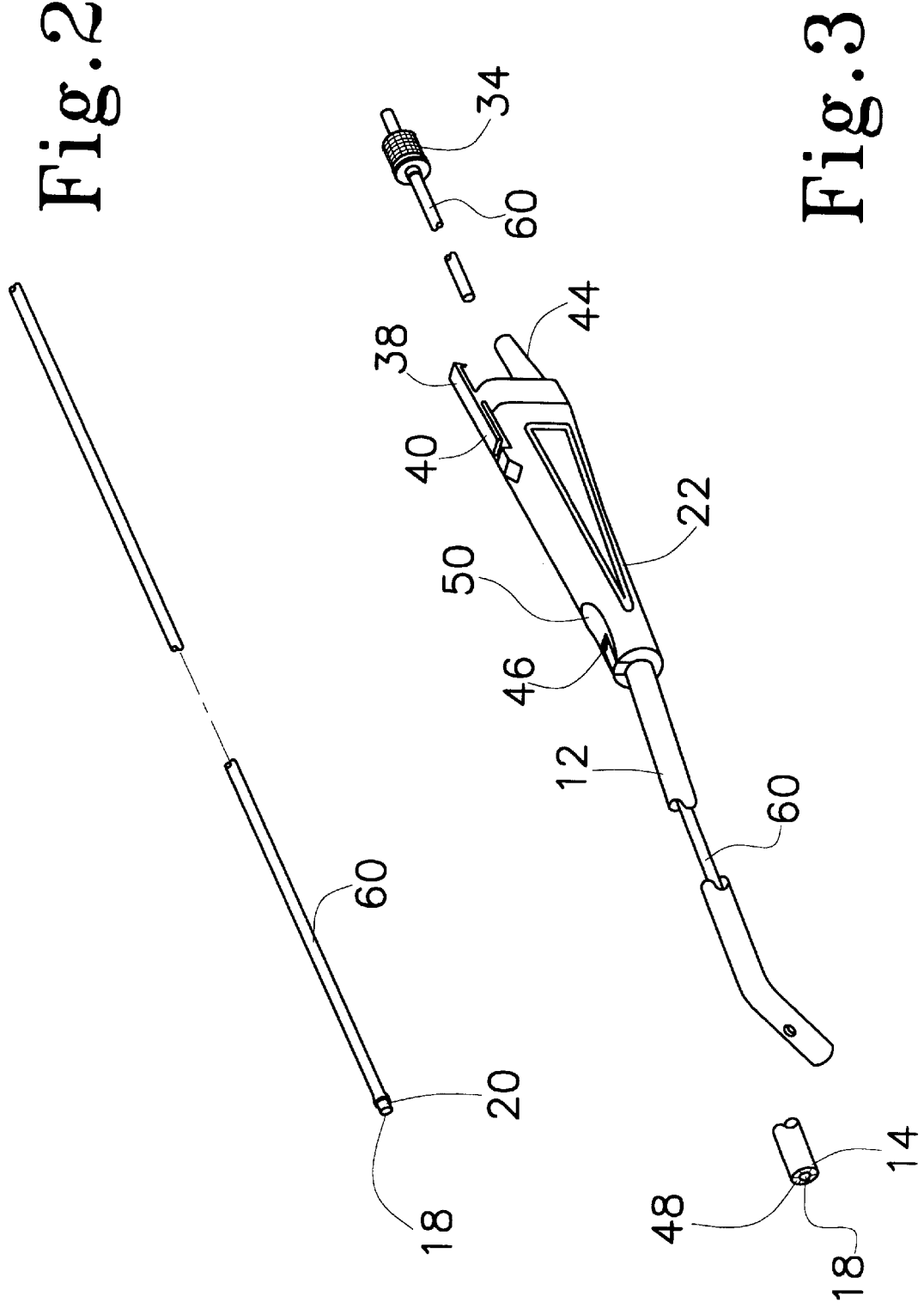

OPTICAL FIBER PROBE PROTECTOR

DESCRIPTION

This application discloses and claims subject matter disclosed in Disclosure Document No. 403276 which is entitled "Fiber Optics Probe Protector" and has a document receipt date of Aug. 1, 1996.

1. Technical Field

This invention relates to the field of optical fiber probes and more specifically to a protector to fit over the optical fiber probe.

2. Background Art

Development of a nonsurgical diagnostic technique for detecting cancer has been in demand because of its obvious advantages over traditional biopsy surgery. Laser-induced fluorescence (LIF) has shown great potential for use in an in vivo procedure for the detection of cancerous tissue. Specifically, the LIF technique utilizes an optical fiber probe which consists of a bundle of optical fibers (i.e. a fiber optic cable) including a plurality of excitation fibers and a plurality of emission fibers. The first end of each excitation fiber is optically connected to an excitation light source and the first end of each emission fiber is connected to a light detector. The distal end of the bundle is positioned in the probe for juxtaposition to the tissue in vivo for analysis and preferably touching the tissue. The tissue is excited via the excitation fibers and the emission radiation from the tissue in the form of laser-induced fluorescence is delivered to the detector through the emission fibers. The output signal from the detector is delivered to a computer. Mathematical manipulation of the output signal illustrates whether the tissue is normal or malignant with excellent results.

The main disadvantage with the set up described is the end of the probe must be cleaned after every use which leads to degradation of the probe. Further, secretions from the tissue to be examined, such as secretions from the wall of the cervix or secretions from the inside of the mouth, interfere with the results.

Therefore, it is an object of the present invention to provide an optical fiber probe protector for protecting the distal end of an optical fiber probe.

It is another object of the present invention to provide an optical fiber probe protector which is disposable.

Further, it is another object of the present invention to provide an optical fiber probe protector which includes a vacuum for removing secretions from the area to be analyzed.

SUMMARY

Other objects and advantages will be accomplished by the present invention which serves to protect a fiber optic probe. The fiber optic probe protector of the present invention includes a sheath, a window and a handle. The sheath defines a tubular configuration, a first end, and a second end and the window is mounted in the first end of the sheath. The handle defines a first end, a second end, an interior cavity and a locking means. The second end of the sheath is mounted to the first end of the handle and the interior cavity of the handle and the sheath provide a passage for a fiber optic probe therethrough such that the face of the probe abuts against the window. The locking means locks the fiber optic probe in position. The fiber optic probe protector also includes a vacuum assembly which when hooked to a vacuum removes secretions or fluid from the surface to be analyzed with the probe.

BRIEF DESCRIPTION OF THE DRAWINGS

The above mentioned features of the invention will become more clearly understood from the following detailed description of the invention read together with the drawings in which:

FIG. 2 illustrates the window assembly with the window mounted to a fiber optic probe;

FIG. 3 illustrates an exploded view of the optical fiber probe protector of the present invention; and, FIG. 4 is a cross sectional view of the optical fiber probe protector.

DESCRIPTION OF PREFERRED EMBODIMENTS

An optical fiber probe protector incorporating various features of the present invention is illustrated generally at 10 in the figures. The optical fiber probe protector 10 is designed to protect an optical fiber probe utilized in in vivo procedures. Moreover, in the preferred embodiment, the optical fiber probe protector 10 includes a vacuum for vacuuming the surface the probe analyzes. Further, the optical fiber probe protector is disposable.

Figure 1:
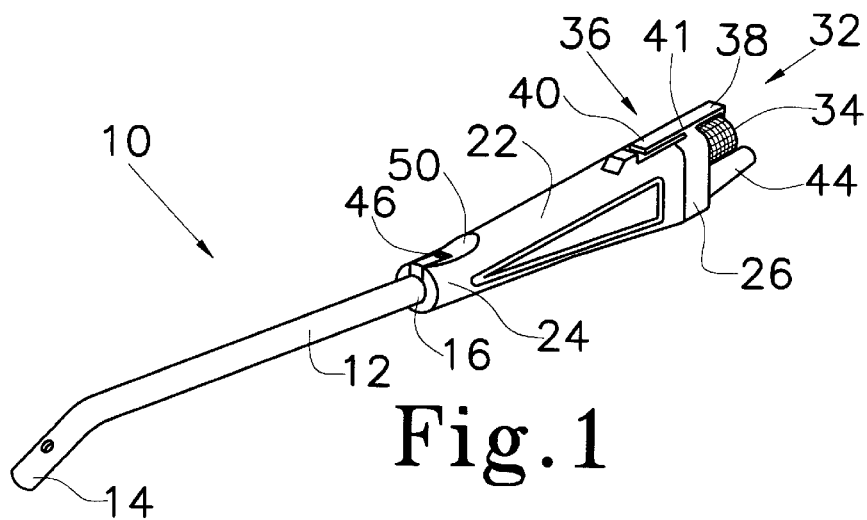
FIG. 1 is a perspective view of the optical fiber probe protector of the present invention.

The optical fiber probe protector is appropriate for use in the laser-induced fluorescence (LIF) technique which utilizes an optical fiber probe for in vivo tissue diagnosis. As shown in FIG. 1, the optical fiber probe protector 10 is generally comprised of a window 18, a sheath 12 and a handle 22.

The sheath 12 defines a first end 14, a second end 16 and a tubular configuration for receiving an optical fiber probe 60 therethrough. The window 18 is mounted in the first end 14 of the sheath 12. The second end 16 of the sheath 12 extends to the first end 24 of the handle 22 and is securely mounted thereto. The sheath 12 is not limited to a specific length and the length is dictated by the use of the fiber optic probe it protects. For example, the sheath 12 of a protector 10 for a probe for oral analysis is shorter in length than the sheath 12 of a protector 10 for a probe for cervical analysis. In the preferred embodiment, the sheath 12 is angled proximate the first end 14, as shown in FIG. 1. In the preferred embodiment, the sheath 12 is fabricated from a rigid material such as plastic.

FIG. 2 illustrates the window 18 abutted against the fiber optic probe 60. The window 18 is configured such that when supported in the sheath 12 it rests flatly against the face of the fiber optic probe 60. The window 18 must be plano/plano, optically clear across the light emitting area of the fiber optics, perpendicular to the fiber optics within 3° and must have minimal hygroscopic properties. Further, the window 18 must be sufficiently rigid so as not to sag at any attitude when held by the edge in very thin sections of 0.030 inches or less. Examples of window materials that are suitable are acrylic, polycarbonate and sapphire. Sapphire is the preferred material.

FIG. 3 illustrates an exploded view of the probe protector 10. The first end 14 of the sheath 12 is shown specifically and illustrates the window 18 mounted in the first end 14 of the sheath 12. In the preferred embodiment, the window 18 is mounted in the first end 14 of the sheath 12 via adhesive bonding which adheres the window 18 in the first end 14 of the sheath 12. Adhesive bonding is preferred to a mechanical squeeze mounting or mechanical groove mounting because the adhesive bond provides the best contamination protection and the least window distortion.

In the preferred embodiment, the probe protector 10 includes a window assembly including a flanged cap 20 in which the window 18 in mounted, as shown in FIG. 2. The flanged cap 20 is placed over the window 18 to prevent loss of the window 18. Further, the flanged cap 20 is configured to receive and protect the face of the optical fiber probe 60 therein. The window 18 is adhesively secured to the flanged cap 20 and the flanged cap 20 is mounted in the first end 14 of the sheath 12.

Figure 4:
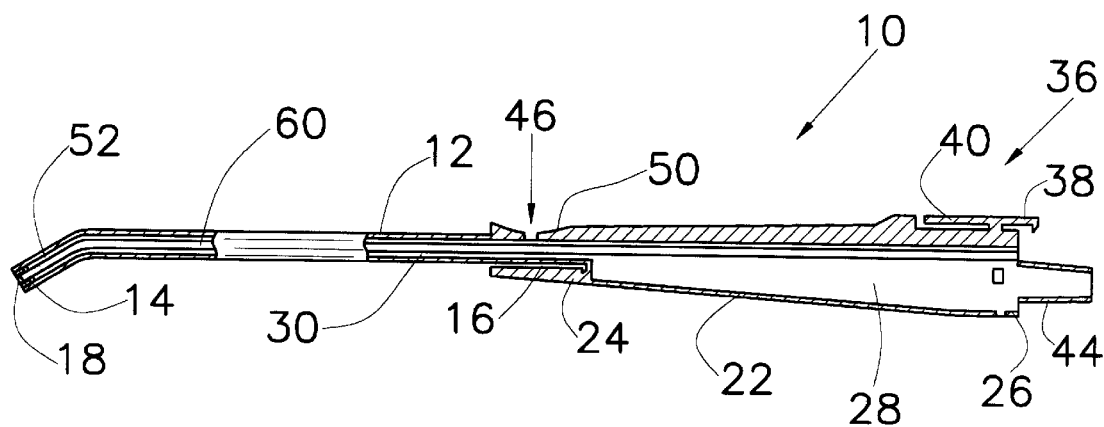

The handle 22 defines a first end 24, a second end 26 and an interior cavity 28. The handle 22 is configured to be easily gripped. A probe passage 30 is defined through the sheath 12 and the handle 22, as shown in FIG. 4. In the preferred embodiment, the handle 22 includes a locking means 32 for locking the fiber optic probe 60 in position. The preferred locking means 32 is shown most clearly in FIG. 3 and includes a cable load cushion 34 for receiving and tightening down upon the probe 60 and a latch trigger 36 for securely holding the cable load cushion 34 in place against the second end 26 of the handle 22. The latch trigger 36 defines a latch 38 which extends away from the second end 26 of the handle 22 and a lever portion 40 which extends in the opposite direction from the latch 38. The middle portion 41 of the latch trigger 36 is anchored to the second end 26 of the handle 22.

In the preferred embodiment, the probe protector 10 also includes a vacuum assembly for connection with a vacuum (not shown) for removing fluid or secretions from the surface to be analyzed. The vacuum assembly includes a vacuum link 44, a vacuum valve 46 and a plurality of vacuum channels 48. The vacuum link 44 extends from the second end 26 of the handle 22 and provides an inlet into the interior cavity 28 defined by the handle 22. The vacuum link 44 is configured to receive a vacuum tube (not shown) thereon. The first end 14 of the sheath 12 defines the plurality of vacuum channels 48 which surround the window 18. The vacuum channels 48 provide a passage through the protector 10 extending through the sheath 12 to the handle 22. It will be noted that the sheath 12 defines an inner diameter which is larger than the outer diameter of the fiber optic probe 60 to be received therethrough such that a fluid passage 52 around the exterior of the fiber optic probe 60 is available, as shown in FIG. 4. The vacuum valve 46 is an opening through the handle 22 and preferably is positioned proximate the first end 24 of the handle 22. In the preferred embodiment, the vacuum valve 46 is positioned in a recess 50 defined by the handle 22. In the preferred embodiment, the handle 22 and the sheath 12 are black in color.

The probe protector 10 is utilized in the following manner. An optical fiber probe 60 is fed through the handle 22 and the sheath 12 such that its face 62 abuts against the window 18 mounted in the first end 14 of the sheath 12. The cable load cushion 34 is locked into position against the second end 26 of the handle 22 via the latch trigger 36. Specifically, the lever 40 is depressed to raise the latch 38 such that the cable load cushion 34 is permitted to abut against the second end 26 of the handle 22. Once in position, the cable load cushion 34 is tightened down on the fiber optic probe 60. Because the first end 14 of the sheath 12 is angled, positioning of the probe protector 10 to take selected measurements is simplified. If secretions or fluid coat the surface to be analyzed, the vacuum assembly is activated to remove the secretions or fluid. Specifically, a vacuum tube which is connected to a vacuum (not shown) is coupled to the vacuum link 44 at the second end 26 of the handle 22. The vacuum is turned on. When the vacuum valve 46 is open (providing passage through the handle 22) there is no suction through the vacuum channels 48. To create suction through the vacuum channels 48, the user must cover the vacuum valve 46. The vacuum valve 46 is positioned such that the user can use his thumb to control suction at the first end 14 of the sheath 12. Once the surface to be analyzed is cleared, the vacuum valve 46 is opened and the LIF measurements can be taken. Once all measurements have been made, the fiber optic probe 60 is removed from the probe protector 10 and the probe protector 10 can be disposed of. Because the face of the fiber optic probe 60 is protected, it is not necessary to autoclave or sterilize the probe 10 after every use such that early degradation of the probe is prevented.

From the foregoing description, it will be recognized by those skilled in the art that a fiber optic probe protector offering advantages over the prior art has been provided. Specifically, the fiber optic probe protector provides a means for protecting the face of a fiber optic probe such that the probe does not have to be sterilized after every use. Moreover, the probe protector includes a vacuum for removing fluid or secretions at the site to be analyzed. Further, the probe protector is disposable.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. A fiber optic probe protector comprising:
   a sheath defining a tubular configuration, a first end, and a second end;
   a window mounted in said first end of said sheath;
   a handle defining a first end, a second end, an interior cavity and a locking means, said second end of said sheath being mounted to said first end of said handle, said interior cavity and said tubular configuration of said sheath providing a passage for a fiber optic probe therethrough such that the face of the probe abuts against said window, said locking means for locking the fiber optic probe in position; and,
   a vacuum assembly for removing fluid from a surface to be analyzed with the fiber optic probe, said vacuum assembly being configured to provide suction at said first end of said sheath.

2. The fiber optic probe protector of claim 1 wherein said vacuum assembly includes a vacuum link, a vacuum valve and a plurality of vacuum channels, said vacuum link extending from said second end of said handle and providing an inlet into said interior cavity of said handle, said vacuum valve being an opening through said handle, said first end of said sheath defining said plurality of vacuum channels, said plurality of vacuum channels being positioned around said window, said sheath defining an inner diameter which is larger than the outer diameter of the probe such that a fluid passage is defined therebetween.

3. The fiber optic probe protector of claim 1 wherein said window is mounted in a flanged cap, said flanged cap is mounted in said first end of said sheath, said flanged cap being configured to receive a fiber optic probe such that the face of the fiber optic probe abuts against said window.

4. A fiber optic probe protector comprising:
   a sheath defining a tubular configuration, a first end, and a second end;
   a window assembly mounted in said first end of said sheath, said window assembly including a flanged cap and a window, said flanged cap being mounted in said first end of said sheath, said window mounted in said flanged cap, said flanged cap being configured to receive a fiber optic probe such that the face of the fiber optic probe abuts against said window;

a handle defining a first end, a second end, an interior cavity and a locking means, said second end of said sheath being mounted to said first end of said handle, said interior cavity and said tubular configuration of said sheath providing a passage for a fiber optic probe therethrough such that the face of the probe abuts against said window, said locking means for locking the fiber optic probe in position; and, a vacuum assembly for removing fluid from a surface to be analyzed with the fiber optic probe, said vacuum assembly including a vacuum link, a vacuum valve and a plurality of vacuum channels, said vacuum link extending from said second end of said handle and providing an inlet into said interior cavity of said handle, said vacuum valve being an opening through said handle, said first end of said sheath defining said plurality of vacuum channels, said plurality of vacuum channels being positioned around said window, said sheath defining an inner diameter which is larger than the outer diameter of the probe such that a fluid passage is defined therebetween.

5. The fiber optic probe protector of claim 4 wherein said locking means includes a cable load cushion and a trigger latch, a middle portion of said trigger latch being mounted to said second end of said handle, said trigger latch defining a lever and a latch, said latch extending away from said second end of said handle, said lever extending in an opposing direction of said latch, a middle portion of said trigger latch being secured to said handle, said lever for depressing to raise said latch for receiving said cable load cushion, said latch for securely holding said cable load cushion against said second end of said handle, said cable load cushion for tightening down on the fiber optic probe.

6. A fiber optic probe protector comprising:

a sheath defining a tubular configuration, a first end, and a second end;

a window mounted in said first end of said sheath;

a handle defining a first end, a second end, an interior cavity and a locking means, said second end of said sheath being mounted to said first end of said handle, said interior cavity and said tubular configuration of said sheath providing a passage for a fiber optic probe therethrough such that the face of the probe abuts against said window, said locking means for locking the fiber optic probe in position; and, a vacuum assembly for removing fluid from a surface to be analyzed with the fiber optic probe, said vacuum assembly including a vacuum link, a vacuum valve and a plurality of vacuum channels, said vacuum link extending from said second end of said handle and providing an inlet into said interior cavity of said handle, said vacuum valve being an opening through said handle, said first end of said sheath defining said plurality of vacuum channels, said plurality of vacuum channels being positioned around said window, said sheath defining an inner diameter which is larger than the outer diameter of the probe such that a fluid passage is defined therebetween.

7. A fiber optic probe protector comprising:

a sheath defining a tubular configuration, a first end, and a second end;

a window mounted in said first end of said sheath;

a handle defining a first end, a second end, an interior cavity and a locking means, said second end of said sheath being mounted to said first end of said handle, said interior cavity and said tubular configuration of said sheath providing a passage for a fiber optic probe therethrough such that the face of the probe abuts against said window, said locking means for locking the fiber optic probe in position, said locking means including a cable load cushion and a trigger latch, a middle portion of said trigger latch being mounted to said second end of said handle, said trigger latch defining a lever and a latch, said latch extending away from said second end of said handle, said lever extending in an opposing direction of said latch, a middle portion of said trigger latch being secured to said handle, said lever for depressing to raise said latch for receiving said cable load cushion, said latch for securely holding said cable load cushion against said second end of said handle, said cable load cushion for tightening down on the fiber optic probe.

* * * * *